March 16, 1926.  1,577,349
A. L. MURRAY
PROCESS OF SECURING RUBBER TO LEATHER AND OTHER LIKE MATERIALS
Filed Feb. 2, 1924
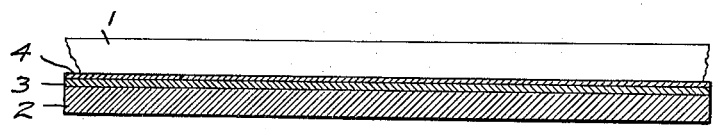
INVENTOR.
Albert L. Murray
BY
Elwin W. Hulse
ATTORNEY.

Patented Mar. 16, 1926.

1,577,349

UNITED STATES PATENT OFFICE.

ALBERT LINN MURRAY, OF AUBURN, INDIANA.

PROCESS OF SECURING RUBBER TO LEATHER AND OTHER LIKE MATERIALS.

Application filed February 2, 1924. Serial No. 690,183.

*To all whom it may concern:*

Be it known that I, ALBERT L. MURRAY, a citizen of the United States, residing at Auburn, in the county of De Kalb and State of Indiana, have invented new and useful Improvements in Processes of Securing Rubber to Leather and Other like Materials, of which the following is a specification.

The invention relates to processes of securing rubber to leather, rubber to rubber, leather to leather and other materials wherein a cement is used to form the union, the present illustration being directed to the application of rubber soles to boots and shoes, the words "rubber soles" including heels.

Heretofore, in affixing a rubber sole to a boot or shoe, the practice has been either to stitch or peg the rubber sole to the leather sole or to cement the two soles together. It is difficult to stitch, nail or peg a rubber sole of desirable or useful resilience to a leather sole and ensure its stability, and it is also difficult to cement the two soles together so that they will not separate in use.

I have found that when two materials such as leather and rubber are cemented together by the usual method of applying cement to the surfaces which are to be joined, the resulting union is not sufficiently strong to stand the bending or flexing strains such as occur in the use of shoe soles, the reason being that only an extremely small amount of the rubber in the cement enters the pores of the materials due to the fact that the greater part of rubber cement is the solvent which quickly evaporates and leaves only a very small amount of rubber deposited by any reasonable number of applications which it would be practical to apply without calling for an unreasonable amount of labor and time.

Because the surfaces of the joined materials are practically in direct contact with other, the pull caused by the motion between them when flexed or bent causes separation by pulling the cement out from the pores of either one material or the other. Tests on a Standard Scott testing machine show that an inch wide strip of material cemented together as above described are separated by a pull of 2½ to 3 pounds.

I have found that where a thin sheet of raw milled rubber is inserted between the rubber and leather the thin sheet has the property of taking up and absorbing within itself a considerable portion of the flexing strain and movement, and that because of this the strain on the cement in the pores of the two materials is considerably reduced. The Scott machine test now shows that it requires five or six pounds pull to cause separation and that the separation is now caused by the cement being pulled out from the pores of the rubber due to the fact that the pores in rubber are very fine and small and hold very little rubber while the pores of roughened leather are much larger and therefore hold more rubber.

I have found that by inseparably joining a sheet of raw milled rubber to a crêpe rubber or to a harder cured rubber which it is desired to join to leather, all possibility of separation of the two rubber portions is eliminated; that in shoes where rubber is used as the outer or tread surface, all shocks and strains start from without and by inseparably joining the raw milled rubber to the tread practically all strain is prevented from reaching the cement in the leather since it is absorbed by the milled rubber. In such a union the Scott machine test now shows that it requires ten to twelve pounds pull to cause separation, the separation now being one of tearing the intermediate raw milled rubber and the result being a union far beyond anything obtained heretofore and liberally strong to withstand any ordinary strains in practical use.

In applying my process to the joining of crêpe rubber soles to boots and shoes, I find it is advantageous to inseparably join a backing of thin raw milled rubber to that side of the crêpe rubber which is to be attached to the boot or shoe, and I accomplish this by heating the raw milled rubber on a rubber calendar and then run the crêpe rubber through the same with the result that the heat of the raw milled rubber and the pressure of the calendar rolls fixes the raw rubber on crêpe and produces an inseparable union between them, but any other method can be used which will inseparably join the two rubber portions.

In the application of my process to the joining of vulcanized rubber to leather, I find it a great advantage, in order to obtain an inseparable union of raw milled rubber to vulcanized rubber and yet retain an outer surface which will be readily and quickly attacked by the solvent in rubber cement, to use two sheets of raw milled rubber. The first sheet is applied to the back of the compounded stock which it is desired to cure or vulcanize, and subjects the same to vulcanizing heat. When the compounded stock containing curing agents has been vulcanized, the exposed side of the backing sheet of raw milled rubber which contained no curing agents, remains temporarily sufficiently raw and uncured, so that when, shortly after the removal of the same from the vulcanizer, a second sheet of raw milled rubber is applied to said raw or sticky surface it will immediately join with the raw, sticky surface and inseparably unite with it.

I find, however, that it is not desirable to omit the application of the second sheet of raw milled rubber for the reason that while the raw milled rubber backing which has been through the vulcanizer will appear sticky or tacky for a time, yet there is a certain amount of indirect curing action caused by this rubber having been in contact with the curing agents of the compounded rubber and that in time a skin or film is formed on the surface which prevents it from being sufficiently attacked by the solvent of rubber cement considering the brief time which it takes the solvent to evaporate. I find that this continued curing action does not extend far enough into the second sheet of raw rubber to affect its surface and I, therefore, have a product, the surface of which will always remain in condition to be attacked by rubber cement and to join immediately and perfectly therewith.

The intermediate sheet of raw milled rubber applied as above described will cause a very strong union of leather to leather as well as of rubber to rubber and rubber to leather, and in the appended claims I use the expression "rubber to leather" as including all materials to which the process is adapted.

In the accompanying drawing I have illustrated the application of the invention to securing a rubber sole to a leather sole in which 1 is the leather sole of a shoe, and 2 a vulcanized rubber tread. 3 represents the sheet of raw milled rubber which has been inseparably secured to the tread by the vulcanization of the tread. 4 represents the second sheet of raw milled rubber which has been applied to the first sheet while the upper surface of the latter was raw and sticky. The opposed surfaces of the sole 1 and sheet 4 are secured together by rubber cement, the leather sole being first roughened. The tread thus attached to the leather sole is practically inseparable therefrom and it will withstand all usual wear. Any unusual strain will tear the raw milled sheet if any separation occurs between the tread and leather sole.

What I claim is:

1. The process of securing rubber to leather which consists in applying a sheet of raw milled rubber to a compounded rubber, then subjecting the same to heat for vulcanizing the compounded rubber, and inseparably securing the sheet thereto then applying a second sheet of raw milled rubber to the exposed surface of the first sheet and finally cementing the exposed surface of the second sheet to the leather.

2. The process of securing rubber to leather which consists in applying a sheet of raw milled rubber to a compounded rubber then subjecting the same to heat for vulcanizing the compounded rubber and inseparably securing one side of the sheet thereto, the opposite side being raw, then applying a second sheet of raw milled rubber to the raw side of the first sheet, the exposed side of the second sheet being adapted to be cemented to the leather.

3. That process of preparing a rubber sheet which consists of taking a sheet of rubber having curing agents therein, taking a second sheet of rubber free from curing agents, placing the two sheets in surface contact, and treating the two sheets under vulcanization heat while maintaining them in closely contacted relation continuing the vulcanization until the sheet containing the curing agents is vulcanized to the degree desired, whereby to leave the second sheet with its exposed surface in a sticky condition, applying to the sticky surface a protection coating of raw rubber free from curing agents whereby the sticky condition is maintained.

In witness whereof I have hereunto subscribed my name this 28th day of January, 1924.

ALBERT LINN MURRAY.